L. L. SPENCER.
VEHICLE DUMPING MECHANISM.
APPLICATION FILED FEB. 8, 1919.
1,299,516.
Patented Apr. 8, 1919.
2 SHEETS—SHEET 1.
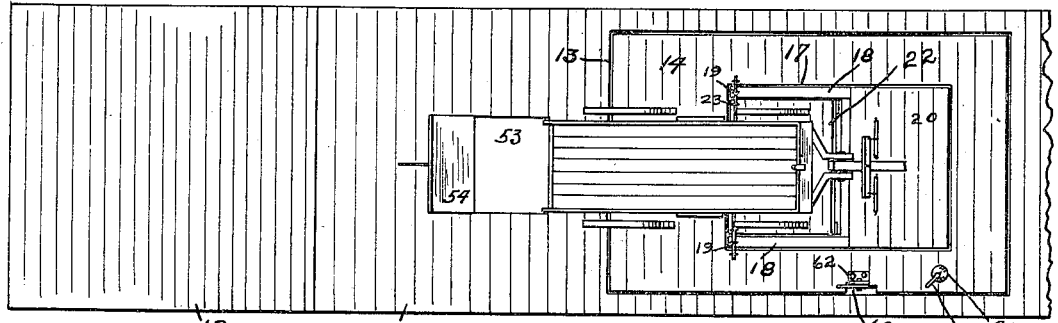
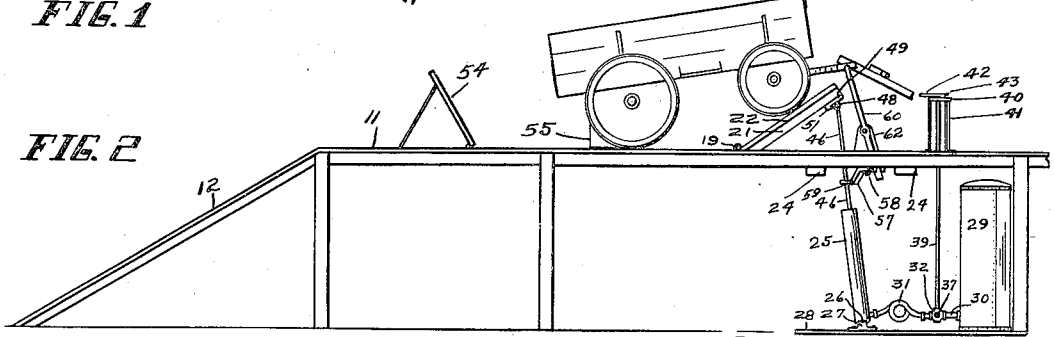
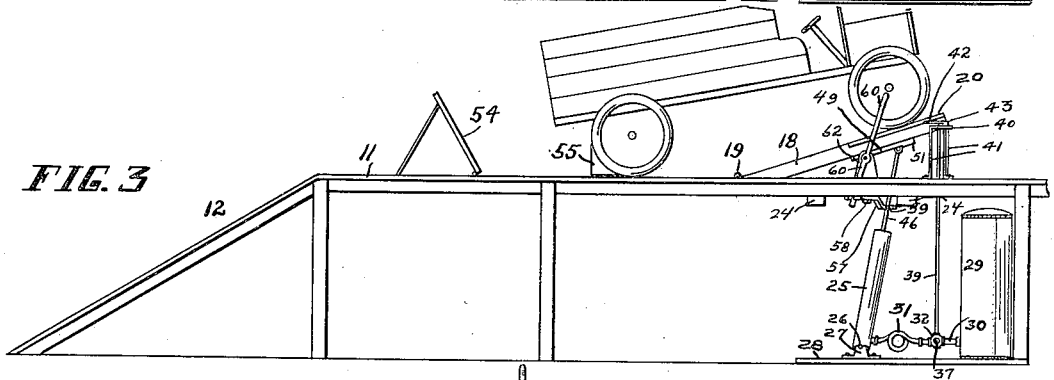
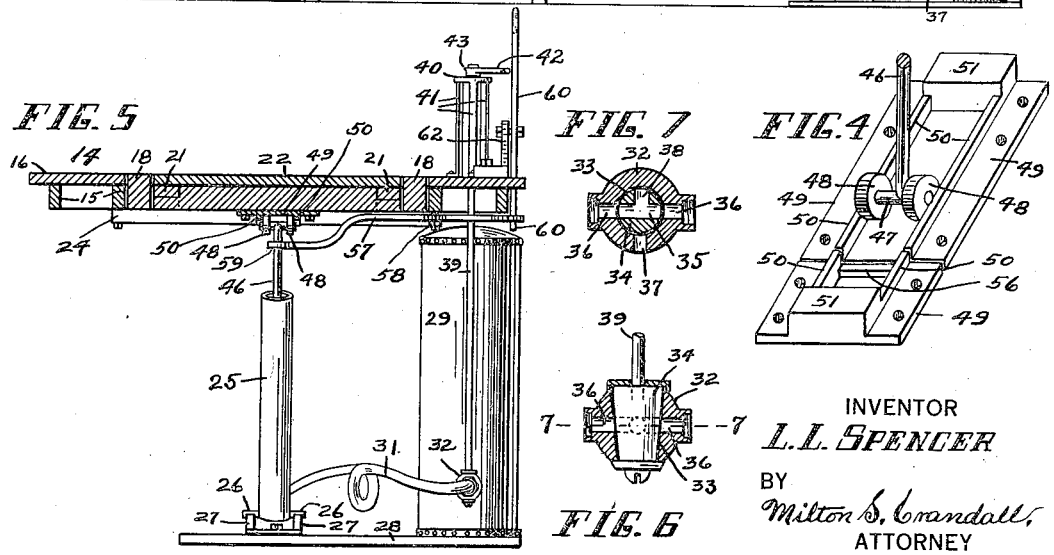
INVENTOR
L. L. SPENCER
BY
Milton S. Crandall
ATTORNEY L. L. SPENCER.
VEHICLE DUMPING MECHANISM.
APPLICATION FILED FEB. 8, 1919.
1,299,516.
Patented Apr. 8, 1919.
2 SHEETS—SHEET 2.
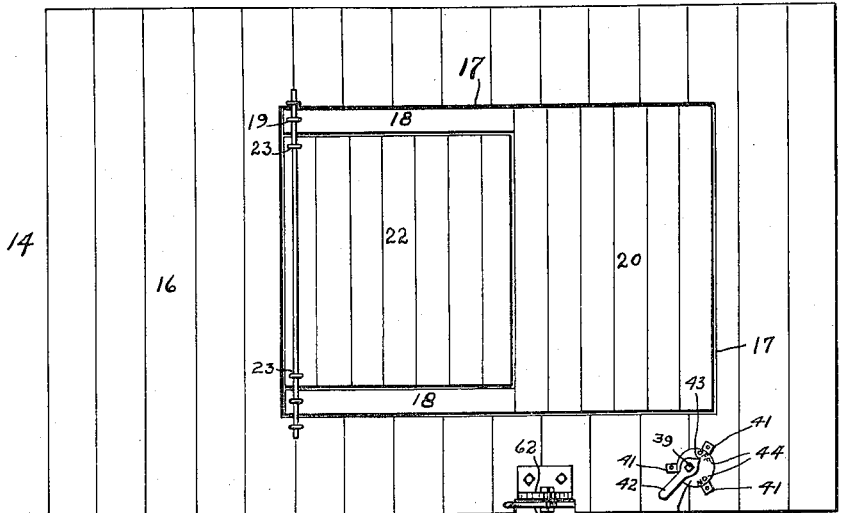
FIG. 8
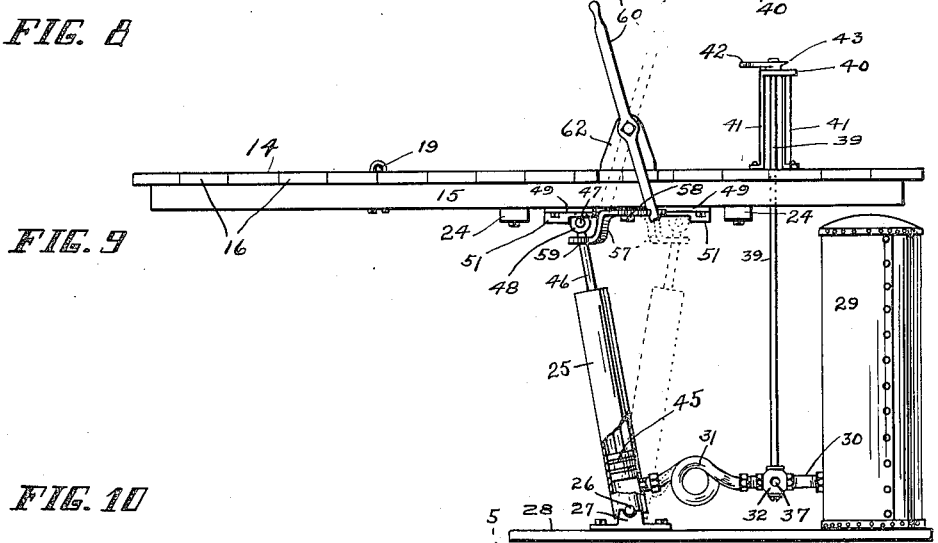
FIG. 9
FIG. 10
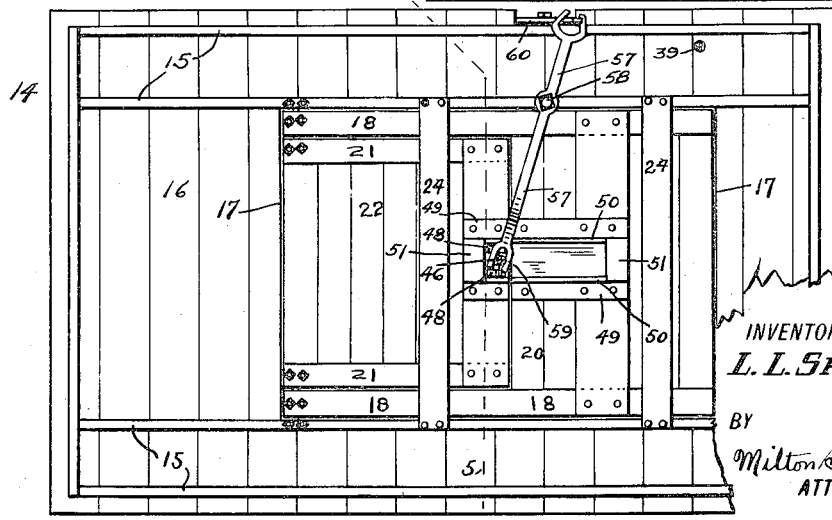
INVENTOR
L. L. SPENCER
BY
Milton S. Crandall,
ATTORNEY

UNITED STATES PATENT OFFICE.

LEWIS L. SPENCER, OF PLANKINTON, SOUTH DAKOTA, ASSIGNOR OF ONE-THIRD TO CHARLES A. EARL AND ONE-THIRD TO WILBERT M. CLAUS, BOTH OF PLANKINTON, SOUTH DAKOTA.

VEHICLE-DUMPING MECHANISM.

1,299,516. Specification of Letters Patent. Patented Apr. 8, 1919.

Application filed February 8, 1919. Serial No. 275,710.

*To all whom it may concern:*

Be it known that I, LEWIS L. SPENCER, a citizen of the United States, and a resident of Plankinton, in the county of Aurora and State of South Dakota, have certain new and useful Improvements in Vehicle-Dumping Mechanism, of which the following is a specification.

The invention aims, primarily, to provide an improved vehicle-dumping mechanism particularly adapted for grain elevators.

Another object of the invention is the production of improved means for dumping vehicles while supported on a scales platform.

The invention further contemplates an improved mechanism adapted to dump either animal-drawn vehicles or longer vehicles, as motor-trucks.

Furthermore, the invention provides a mechanism operable to quickly dump vehicles with a minimum of power and with little effort by the operator.

With these and other objects in view, the invention, consisting in the construction, combination and novel arrangement of parts, will be fully understood from the following description, reference being had to the accompanying drawings, which form a part of this application and in which like characters of reference indicate corresponding parts throughout the several views, of which,—

Figure 1 is a plan of an elevator runway and scales-platform, equipped with the device of my invention and supporting a wagon thereon;

Fig. 2 is a side elevation of the same;

Fig. 3 is a similar view, with a motor-truck supported thereon;

Fig. 4 is an enlarged inverted perspective view of the jack-shaft guide;

Fig. 5 is an enlarged transverse vertical section of the scales-platform and associated parts, taken on the line 5—5, of Fig. 10;

Fig. 6 is an enlarged vertical section of the controlling valve;

Fig. 7 is a horizontal section of the same, taken on the line 7—7 of Fig. 6;

Fig. 8 is an enlarged plan of the scales-platform and dump-controlling mechanism;

Fig. 9 is a side elevation of the same, a part being cut away; and

Fig. 10 is an inverted plan of the scales-platform and parts associated therewith.

Although I have illustrated and hereinafter described the preferred embodiment of the invention, I would not be understood as being limited to the specific structure chosen for illustration, for various alterations and modifications may be made in the details of construction and arrangement of parts without departing from the spirit and scope of the invention as defined in the appended claims.

Referring, now, to the illustrations, 11 is a runway, or elevated platform, such as is common in grain elevators, and provided with an inclined approach, 12, and an opening, 13, in which floats the customary scales-platform, 14, upon which vehicles are driven and weighed, and including beams, 15, and a floor, 16, supported thereby.

The scales-platform is provided with an intermediate rectangular opening, 17, in which is mounted a vertically-movable platform, including side beams, 18, having their rear ends suitably pivoted to the platform, 14, as at 19; and having their forward portions covered by flooring, 20. The unfloored portion of the movable platform incloses a second vertically-movable platform, including side beams, 21, and flooring, 22, thereon. The said second platform is pivoted at its rear end, as at 23, coaxially with the pivots, 19. The said vertically-movable platforms rest, normally, on cross beams, 24, secured to the under side of the scales-platform; and are preferably operated independently of each other and by fluid-pressure-operated means, as an upright cylinder, 25, positioned below the scales-platform, and provided at its lower end with lateral trunnions, 26, pivoted in suitable bearings, 27, on a base, 28, whereby the cylinder may be oscillated forwardly and rearwardly. The cylinder receives fluid-pressure through a suitable passage from a source of fluid pressure, preferably a compress-air tank, 29. In the preferred embodiment the said passage includes an outlet pipe, 30, leading from the tank and communicating with the lower end of the cylinder through a flexible duct, 31, and a suitable three-way valve, interposed between the said pipe and duct, and which may include a casing, 32, having a vertically-disposed tapered bore, 33, in which rotates a valve, 34, having a transverse passage, 35, adapted to register with openings, 36, in opposite sides of the casing, one of which communicates with the pipe, 30, and the other with the duct, 31. At right-angles to the openings, 36, the casing is provided with an outlet or escape passage, 37; and the valve is provided with a lateral passage, 38, disposed at right-angles to and communicating with the passage, 35. The valve is rotated by a stem, 39, fixed at its lower end to the valve and extending freely through the scales-platform floor and a dial plate, 40, having supports, 41, mounted on the platform. The upper end of the stem carries a lateral hand-grip, 42, having an indicator, 43, to register with dial characters, 44, to indicate respectively, the opened and closed positions of the valve.

When the valve is open, as shown in Fig. 7, the pressure passes from the tank to the cylinder, and the passage, 38, is closed by the casing wall, and when the valve is rotated counter-clockwise to place the passage 38 in registration with the opening, 36, communicating with the duct, 31, the valve will close the other opening, 36, and one end of the passage, 35, will register with the opening, 37, to permit escape of pressure from the cylinder.

Within the cylinder reciprocates the piston, 45, (Fig. 9), carrying a piston-rod, 46, provided at its upper end with a short cross shaft, 47, on the ends of which rotate friction-rollers, 48, movable forwardly and rearwardly in a suitable guide, as a plate, 49, having rails, 50, which prevent lateral displacement of the rollers. The said plate is mounted on the under side of the free end portion of the platform, 22, and the under side of the adjacent portion of the platform, 20, and is divided transversely in two parts coincident the adjacent edges of said portions. The plate is provided with end stops, 51, to limit the movement of the friction-rollers longitudinally of the platform.

In the rear of the scales-platform the runway is provided with an opening, 53, normally closed by a trap-door, 54. When a wagon is driven onto the scales-platform, the front wheels thereof rest upon the platform, 22. Prior to dumping, the rear wheels are blocked, as at 55, (Fig. 2), and the cylinder rearwardly inclined to place the friction-rollers at the rear end of the guide, or that part of the guide mounted on the platform, 22, then as the piston, or jack-shaft is forced upwardly, the said platform is lifted and the front end of the wagon thereby raised to facilitate dumping its contents through the opening, 53. The guide part secured to the said platform is provided with a forward stop, 56, (Fig. 4), between which and the adjacent stop, 51, the rollers rest when the said platform is to be raised, to prevent displacement of the rollers from the front end of the guide part.

When a motor-truck, or other vehicle having a wheel-base too long to be accommodated by the platform, 22, is to be dumped, its front wheels rest upon the platform, 20, and its rear wheels blocked, as at 55, (Fig. 3). The cylinder is then shifted forwardly, placing the jack-shaft under the intermediate portion of the platform, 20, to raise the said platform and incline the truck as shown.

The jack-shaft is preferably shifted by means of a horizontal lever, 57, fulcrumed, as at 58, to the scales-platform, bifurcated at one end, 59, to receive the jack-shaft, and engaged at the other end by a hand-lever, 60, depending below the scales-platform, and fulcrumed on a suitable bearing, 62, on the said platform.

It is now evident forward and rearward movement of the hand-lever accordingly shifts the cylinder and jack-shaft.

Through the operation of the controlling valve the pressure from the tank may be cut off and the pressure permitted to escape from the cylinder whereupon the raised platform will drop to its normal position.

Obviously, other shifting devices than those illustrated may be employed to coöperate with the jack-shaft to raise either platform desired, and still remain within the scope of my invention.

It is also evident the device of my invention may be applied to a fixed platform, in lieu of one that is movable as a scales-platform. It is also clear the device in no way interferes with the free and accurate operation of the scales-platform, as all parts carried by the scales-platform are free to move therewith.

Having thus described my invention, what I claim as new and desire to secure by Letters Patent of the United States, is,—

1. A vehicle-dumping mechanism for relatively long and short vehicles, including a vehicle-supporting platform, two members pivoted thereon to swing vertically, and adapted, respectively, to tilt long and short vehicles; and actuating means under the front portions of said members and shiftable from one to the other of said members, whereby one of said members may be actuated independently of the other.

2. A vehicle-dumping mechanism for relatively long and short vehicles, comprising a member movable vertically to elevate one end of a vehicle, a second member movable vertically to elevate one end of a longer vehicle, and actuating means adapted to be shifted to and from operative positions with respect to either member.

3. A vehicle-dumping mechanism for relatively long and short vehicles, comprising a member movable vertically to elevate one end of a vehicle, a second member movable vertically to elevate one end of a longer vehicle, and means for actuating said members including a source of fluid-pressure, a movably-mounted cylinder to receive pressure from said source, a piston within the cylinder, a rod on the piston adapted to be engaged with either of said members by movement of the cylinder, and means for moving the cylinder and piston.

4. A vehicle-dumping mechanism for relatively long and short vehicles comprising two individually-operated vehicle-tilting members, one for long vehicles and the other for short vehicles, and an element operable to actuate said members, and shiftable to and from operative positions, with respect to either member.

5. A vehicle-dumping mechanism for relatively long and short vehicles, comprising two individually operated vehicle tilting members, one for long and the other for short vehicles, an element operable to actuate said members and shiftable to and from operative positions with respect to either member, and hand-lever-operated means for shifting said element.

6. A vehicle-dumping mechanism for relatively long and short vehicles, comprising a vehicle-supporting platform, two members pivoted coaxially thereon to swing vertically and adapted, respectively, to tilt long and short vehicles, and means for actuating said members, including a tilting cylinder, a piston therein, a rod on the piston engageable with either member by tilting the cylinder, a source of fluid-pressure, a valved passage between the cylinder and said source, and means controlled above the platform for opening and closing the passage.

7. A vehicle-dumping mechanism for relatively long and short vehicles, comprising a vehicle-supporting platform, relatively long and short members pivoted coaxially thereon to swing vertically, and adapted, respectively, to tilt long and short vehicles, a cylinder shiftably mounted below the platform, a piston therein, a rod on the piston engageable with either of said members by shifting the cylinder, a source of fluid-pressure to supply pressure to the cylinder, and means for shifting the cylinder and piston.

8. A vehicle-dumping mechanism for relatively long and short vehicles, comprising a vehicle-supporting platform, relatively long and short members pivoted coaxially thereon to swing vertically and adapted, respectively, to tilt long and short vehicles, a cylinder shiftably mounted below the platform, a piston therein, a rod on the piston, a guide-bearing of two separate parts mounted, respectively, on said members, a part on the rod engageable with the guide-bearing and movable to and from either of said parts by shifting the cylinder and piston, whereby either member may be actuated, a source of fluid-pressure to supply pressure to the cylinder, and means for shifting the cylinder and piston.

9. A vehicle-dumping mechanism for relatively long and short vehicles, comprising a vehicle-supporting platform, relatively long and short members pivoted coaxially thereon to swing vertically and adapted, respectively, to tilt long and short vehicles, a cylinder shiftably mounted below the platform, a piston therein, a rod on the piston, a guide-bearing of two separate parts mounted, respectively on said members, a part on the rod engageable with the guide-bearing and movable to and from either of said parts by shifting the cylinder and piston, whereby either member may be actuated, a source of fluid-pressure to supply pressure to the cylinder, and hand-lever-operated means controlled above the platform for shifting the cylinder and piston.

In testimony whereof I have hereunto set my hand, this 16 day of January, 1919.

LEWIS L. SPENCER.